(12) United States Patent
Shirakabe et al.

(10) Patent No.: US 8,684,321 B2
(45) Date of Patent: Apr. 1, 2014

(54) VIBRATION ISOLATING VEHICLE ATTACHMENT ASSEMBLY

(75) Inventors: Norimichi Shirakabe, Novi, MI (US); Timothy D Pearson, Palos Hills, IL (US); Christopher M Pangallo, Frankport, IL (US)

(73) Assignee: Illinois Tool Works Inc., Glenview, IL (US)

( * ) Notice: Subject to any disclaimer, the term of this patent is extended or adjusted under 35 U.S.C. 154(b) by 47 days.

(21) Appl. No.: 13/581,671

(22) PCT Filed: Mar. 24, 2011

(86) PCT No.: PCT/US2011/029778
§ 371 (c)(1),
(2), (4) Date: Aug. 29, 2012

(87) PCT Pub. No.: WO2011/123323
PCT Pub. Date: Oct. 6, 2011

(65) Prior Publication Data
US 2013/0009020 A1     Jan. 10, 2013

Related U.S. Application Data

(60) Provisional application No. 61/320,383, filed on Apr. 2, 2010.

(51) Int. Cl.
*F16L 3/08* (2006.01)
(52) U.S. Cl.
USPC .......... 248/74.1; 248/68.1; 248/74.4; 24/297; 411/433; 411/511
(58) Field of Classification Search
USPC ........ 248/71, 74.1, 74.2, 68.1, 74.4, 55, 74.3, 248/510, 49, 58, 73, 74.35; 24/297, 530; 411/433, 437, 511
See application file for complete search history.

(56) References Cited

U.S. PATENT DOCUMENTS

| | | | | |
|---|---|---|---|---|
| 4,467,988 A * | 8/1984 | Kraus | ......................... | 248/68.1 |
| 4,541,602 A * | 9/1985 | Potzas | ......................... | 248/544 |
| 4,717,100 A * | 1/1988 | Klein | ............................. | 248/73 |
| 4,850,778 A * | 7/1989 | Clough et al. | ................ | 411/433 |
| 4,881,705 A * | 11/1989 | Kraus | ......................... | 248/74.2 |

(Continued)

FOREIGN PATENT DOCUMENTS

| | | |
|---|---|---|
| DE | 8529669 U1 | 11/1985 |
| EP | 0886093 A1 | 12/1998 |
| WO | 02/097315 A1 | 12/2002 |
| WO | 2010110985 A1 | 9/2010 |

OTHER PUBLICATIONS

An International Search Report, dated Jun. 10, 2011, in International Application No. PCT/US2011/029778.

*Primary Examiner* — Kimberly Wood
(74) *Attorney, Agent, or Firm* — Mark W. Croll; Paul F. Donovan

(57) ABSTRACT

A stud retainer is configured to securely retain a fastening stud. The stud retainer includes a base integrally connected to beams that are in turn integrally connected to a wall opposite the base. A stud retainer chamber is defined between the base, the beams, and the wall. A vibration-damping interface extends outwardly from the beams. The vibration-damping interface may include a plurality of fingers. The stud retainer may also include at least one flexible brace extending from said wall toward said base.

14 Claims, 3 Drawing Sheets

(56) References Cited

U.S. PATENT DOCUMENTS

| | | | | |
|---|---|---|---|---|
| 4,905,942 A * | 3/1990 | Moretti | ............ | 248/68.1 |
| 5,002,243 A * | 3/1991 | Kraus et al. | ............ | 248/68.1 |
| 5,033,701 A * | 7/1991 | Kraus | ............ | 248/68.1 |
| 5,168,604 A * | 12/1992 | Boville | ............ | 24/297 |
| 5,170,984 A * | 12/1992 | Ruckwardt | ............ | 248/635 |
| 5,184,794 A * | 2/1993 | Saito | ............ | 248/68.1 |
| 5,271,587 A * | 12/1993 | Schaty et al. | ............ | 248/68.1 |
| 5,271,588 A * | 12/1993 | Doyle | ............ | 248/68.1 |
| 5,291,639 A * | 3/1994 | Baum et al. | ............ | 24/297 |
| 5,302,070 A * | 4/1994 | Kameyama et al. | ............ | 411/437 |
| 5,458,303 A * | 10/1995 | Ruckwardt | ............ | 248/74.2 |
| 5,660,513 A * | 8/1997 | Shibanushi | ............ | 411/433 |
| 5,816,762 A * | 10/1998 | Miura et al. | ............ | 411/433 |
| 5,879,115 A * | 3/1999 | Medal | ............ | 411/82 |
| 5,954,300 A * | 9/1999 | Sturies et al. | ............ | 248/68.1 |
| 6,036,145 A * | 3/2000 | Calabrese et al. | ............ | 248/68.1 |
| 6,070,836 A * | 6/2000 | Battie et al. | ............ | 248/68.1 |
| 6,152,406 A * | 11/2000 | Denndou | ............ | 248/68.1 |
| 6,179,539 B1 * | 1/2001 | Benoit et al. | ............ | 411/433 |
| 6,206,330 B1 * | 3/2001 | Oi et al. | ............ | 248/68.1 |
| 6,206,606 B1 * | 3/2001 | Mita et al. | ............ | 403/320 |
| 6,290,201 B1 * | 9/2001 | Kanie et al. | ............ | 248/636 |
| 6,450,459 B2 * | 9/2002 | Nakanishi | ............ | 248/68.1 |
| 6,565,049 B2 * | 5/2003 | Hahn | ............ | 248/68.1 |
| 6,585,196 B2 * | 7/2003 | Nakanishi | ............ | 248/68.1 |
| 6,598,836 B1 * | 7/2003 | Leon | ............ | 248/74.1 |
| 6,682,026 B2 * | 1/2004 | Nagayasu | ............ | 248/74.2 |
| 6,708,931 B2 * | 3/2004 | Miura | ............ | 248/68.1 |
| 6,729,822 B2 * | 5/2004 | Sbongk | ............ | 411/433 |
| 6,915,990 B2 * | 7/2005 | Maruyama | ............ | 248/68.1 |
| 6,955,514 B2 * | 10/2005 | Hoshi | ............ | 411/508 |
| 7,172,162 B2 * | 2/2007 | Mizukoshi et al. | ............ | 248/68.1 |
| 7,207,528 B2 * | 4/2007 | Kato | ............ | 248/55 |
| 7,267,307 B2 * | 9/2007 | Bauer | ............ | 248/65 |
| 7,278,190 B2 * | 10/2007 | Fischer et al. | ............ | 24/530 |
| 7,614,589 B2 * | 11/2009 | Kato | ............ | 248/55 |
| 7,651,057 B2 * | 1/2010 | Sedivy et al. | ............ | 248/68.1 |
| 7,891,151 B2 * | 2/2011 | Sano | ............ | 52/506.05 |
| 8,007,029 B2 * | 8/2011 | Sano | ............ | 296/180.1 |
| 8,328,488 B2 * | 12/2012 | Luk | ............ | 411/433 |
| 8,356,778 B2 * | 1/2013 | Birli et al. | ............ | 248/73 |
| 2004/0217236 A1 * | 11/2004 | Shibuya | ............ | 248/68.1 |
| 2006/0099049 A1 | 5/2006 | Peterson | | |
| 2009/0028668 A1 | 1/2009 | Luk | | |
| 2009/0166489 A1 * | 7/2009 | Volchko | ............ | 248/205.1 |

* cited by examiner

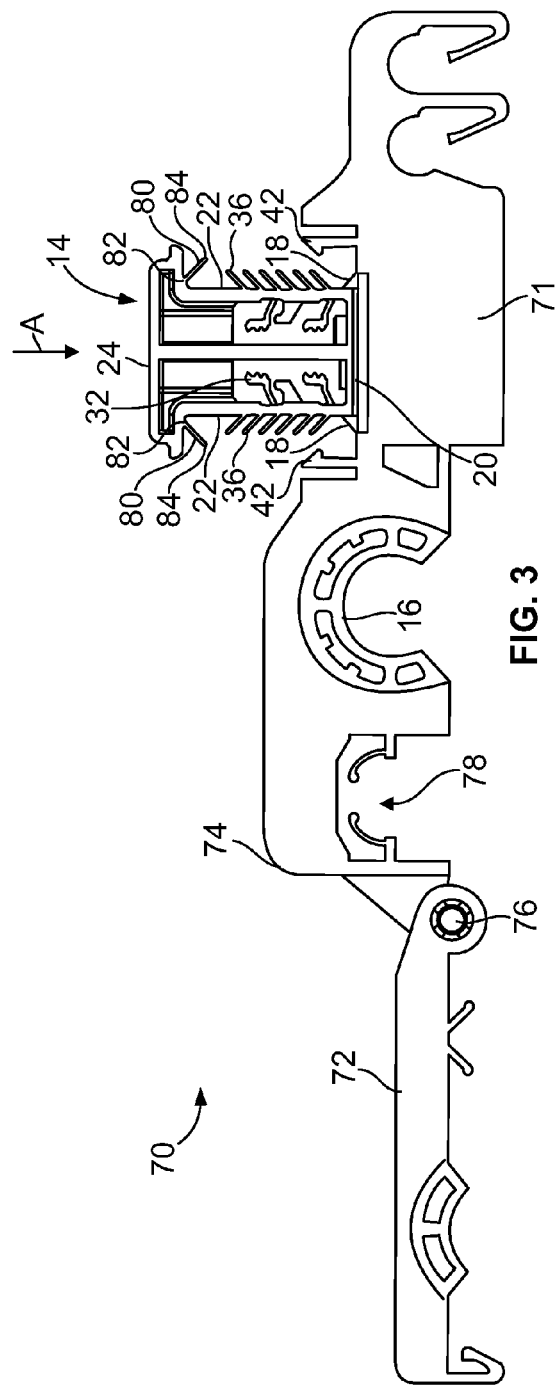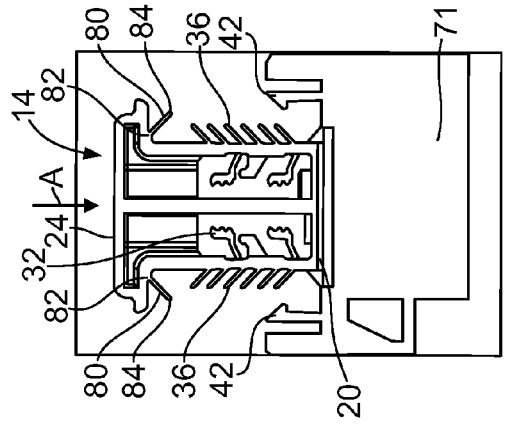

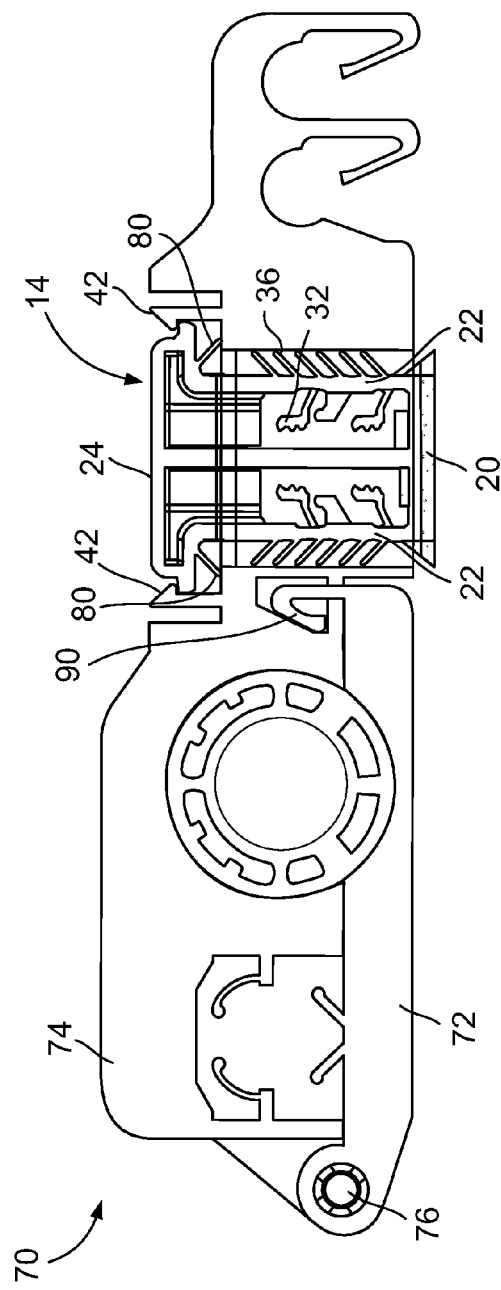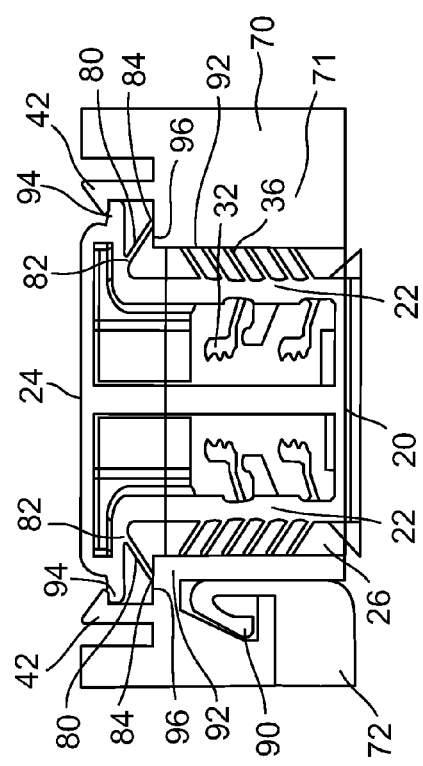

VIBRATION ISOLATING VEHICLE ATTACHMENT ASSEMBLY

RELATED APPLICATIONS

This application is based on International Application No. PCT/US2011/029778, filed Mar. 24, 2011 and relates to and claims priority benefits from U.S. Provisional Patent Application No. 61/320,383 entitled "Vibration Isolation Vehicle Attachment Device," filed Apr. 2, 2010.

FIELD OF EMBODIMENTS OF THE INVENTION

Embodiments of the present invention generally relate to a stud retainer, and more particularly to a stud retainer that may be formed of plastic and commonly used in automotive applications.

BACKGROUND

Various components, such as conduits and tubes, may be secured to surfaces, such as walls, ceilings or the like, through fastening assemblies. For example, a cylindrical tube may be secured to a wall through a fastening assembly having a tube channel that snapably secures around a portion of the tube. The fastening assembly itself may be secured to the wall through a stud that is received and retained by a stud retainer, such as shown and described in United States Patent Application Publication No. 2006/0099049, filed Sep. 16, 2005, and United States Patent Application Publication No. 2009/0028668, filed May 7, 2008, both of which are hereby incorporated by reference in their entireties.

Stud retainers have been used with vehicle hoods, cabinet doors, protective covers, and various other applications that are configured for repeated engagement and disengagement between components. For example, automotive vehicles typically include various fluid lines or tubes, such as brake and fuel lines, within an engine compartment. The tubes are securely held in place within a vehicle.

It is generally desirable to limit noises that may distract or irritate operators and passengers of a vehicle. Devices have been developed that are configured to isolate tubes and prevent the vibration of the tube from transferring into the vehicle body at or proximate the attachment location. However, it has been found that such devices still allow vibratory energy to pass into the vehicle.

SUMMARY OF EMBODIMENTS OF THE INVENTION

Certain embodiments of the present invention provide a connector assembly configured to secure tubing to a vehicle frame. The assembly includes a main body including tube-securing chambers and a retainer channel. The assembly also includes a stud retainer aligned with the retainer channel and integrally connected to the main body through flash gates. The flash gates are configured to be broken so that the stud retainer is retained and isolated within the retainer channel. The main body may include opposing clips configured to snapably secure to a portion of the wall.

The stud retainer includes a base integrally connected to beams that are in turn integrally connected to a wall opposite the base. A stud retainer chamber is defined between the base, the beams, and the wall. A plurality of vibration-damping fingers extend outwardly from the beams.

Each of the fingers may include a flex joint integrally connected to one of the beams. An angled free end outwardly extends from the flex joint. The flex joint is closer to the base than the angled free end.

The stud retainer may also include at least one flexible brace extending from the wall toward the base.

The stud retainer may also include retaining arms extending from the beams within the stud retainer chamber.

The main body may also include a latching cover configured to be selectively opened and closed to allow tubing to be positioned within the tube-securing chambers.

Certain embodiments of the present invention provide a stud retainer configured to securely retain a fastening stud. The stud retainer includes a base integrally connected to beams that are in turn integrally connected to a wall opposite the base, wherein a stud retainer chamber is defined between the base, the beams, and the wall. The stud retainer also includes a vibration-damping interface extending outwardly from the beams.

The vibration-damping interface may include a plurality of fingers. Each of the fingers may include a flex joint integrally connected to one of the beams, wherein an angled free end outwardly extends from the flex joint, and wherein the flex joint is closer to the base than the angled free end.

The stud retainer may also include at least one flexible brace extending from the wall toward the base. The at least one flexible brace may include a flex joint proximate the wall, and a free end extending outwardly from the flex joint. The free end may be closer to the base than the flex joint.

BRIEF DESCRIPTION OF SEVERAL VIEWS OF THE DRAWINGS

FIG. 3 illustrates a lateral view of a molded connector assembly, according to an embodiment of the present invention.

FIG. 4 illustrates a lateral view of a stud retainer positioned above a routing clip of a connector assembly, according to an embodiment of the present invention.

FIG. 5 illustrates a transverse cross-sectional view of an assembled connector assembly, according to an embodiment of the present invention.

FIG. 6 illustrates a transverse cross-sectional view of a stud retainer securely isolated within a routing clip of a connector assembly, according to an embodiment of the present invention.

Figure 1:
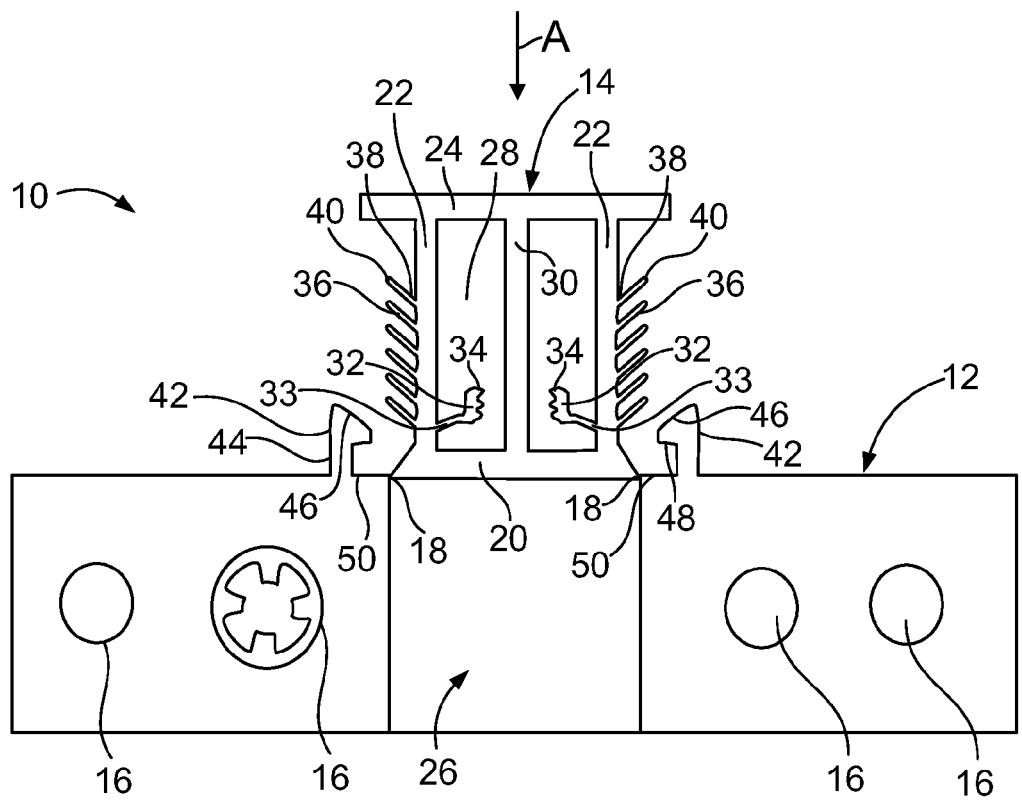
FIG. 1 illustrates a transverse cross-sectional view of a molded connector assembly, according to an embodiment of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE INVENTION

FIG. 1 illustrates a transverse cross-sectional view of a molded connector assembly 10, according to an embodiment of the present invention. The connector assembly 10 includes a main body 12 integrally formed with a stud retainer 14. The main body 12 includes a plurality of tube channels 16, each of which may be sized differently to accommodate different sized tubes (not shown). The tube channels 16 are configured to securely engage around outer circumferential surfaces of tubes. The tube channels 16 may be lined with thermoplastic elastomer overmold.

Optionally, instead of tube channels, the connector assembly 10 may include clamps, grooves, latches, clasps, barbs, or the like configured to securely retain various other components, such as rails, beams, or the like. In general, the connector assembly 10 may be configured to secure any component(s) to another structure, such as a vehicle frame. The main body 12 may alternatively be formed and configured similar to those shown and described in WO 2010/110985, entitled "Stud Retainer Assembly," which is hereby incorporated by reference in its entirety.

As shown in FIG. 1, the stud retainer 14 is integrally connected to the main body 12 through flash gates 18. The stud retainer 14 includes a planar base 20 integrally connected to upstanding beams 22 that are in turn integrally connected to an upper planar wall 24. The planar base 20 is integrally formed with the flash gates 18 that are in turn integrally connected to a top surface 50 of the main body 12. The flash gates 18 are configured to be broken so that the stud retainer 14 may be driven into a channel 26 formed through the main body 12.

The beams 22 are perpendicular to the base 20 and the wall 24. A stud-retaining chamber 28 is defined between the beams 22, the base 20, and the wall 24. A stud opening (hidden from view) is formed through the base 20 and is configured to allow a stud to pass into the stud-retaining chamber 28.

Support straps 30 may extend from outer edges of the base 20 mid-way between the beams 22 to outer edges of the wall 24. The straps 30 provide additional bracing support between the base 20 and the wall 24.

Retaining arms 32 extend from interior surfaces of the beams 22 into the chamber 28. Each retaining arm 32 includes a hinge 33 integrally connected to a stud engagement member 34. Each hinge 33 integrally extends from interior surfaces of a beam 22. More or less retaining arms 32 than those shown may be used.

The hinges 33 are flexible and allow the stud engagement members 34 to pivot about the hinges 33 with respect to the beams 22. The hinges 33 may be at a 20° angle with respect to the plane of the base 20. It has been found that this angle reduces stress on the hinges 33 and allows the retaining arms 32 to upwardly deflect easily and smoothly. Nevertheless, the angle may be adjusted to accommodate varying desired retention forces.

Operation and further details regarding the retaining arms 32 and stud retainer 14 are found in WO 2010/110985, which, as noted above, is incorporated by reference in its entirety.

Flexible fingers 36 outwardly extend from the beams 22 on either side of the stud retainer 14. The fingers 36 are integrally formed with the stud retainer 14. The fingers 36 connect to the beams 22 at flex joints 38 that are disposed below (that is, closer to the base 20) than respective free ends 40. Accordingly, the free ends 40 of the fingers 36 angle away from the base 20.

Figure 2:
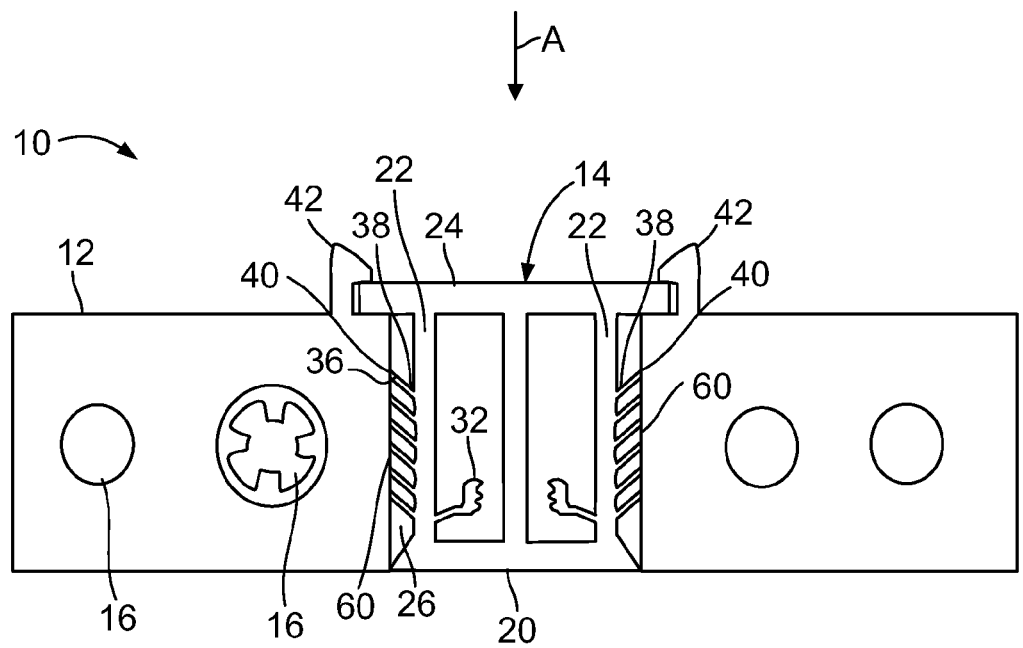
FIG. 2 illustrates a transverse cross-sectional view of an assembled connector assembly, according to an embodiment of the present invention.

As shown in FIG. 1, opposing clips 42 upwardly extend from the upper surface of the main body 12. Each clip 42 includes a post 44 integrally formed with a ramped stud 46. As the stud retainer 14 is urged in the direction of arrow A, the opposing clips 42 snapably engage the top wall 24 so that outer edges of the top wall 24 are securely fastened underneath lower flat edges 48 of the studs 46 and the upper surface 50 of the main body 12, as shown in FIG. 2. As shown in FIG. 1, however, the connector assembly 10 is molded and formed as a single piece with the stud retainer 14 positioned above the channel 26.

FIG. 2 illustrates a transverse cross-sectional view of the assembled connector assembly 10, according to an embodiment of the present invention. In order to assemble the assembly 10 after it has been molded and formed, the stud retainer 14 is urged into the channel 26 in the direction of arrow A. When fully-assembled, the top wall 24 is secured in position by the opposing clips 42, as noted above.

In the fully assembled position, the free ends 40 of the fingers 36 abut into interior surfaces 60 of the main body 12 that define the channel 26. Because the fingers 36 are flexible and able to flex, pivot, and bend about the flex joints 38, the fingers 36 are able to dampen and absorb vibratory energy within the stud retainer 14 and/or the main body 12. Accordingly, the fingers 36 act to prevent vibratory energy within the stud retainer 14 and/or the main body 12 from transferring therebetween. Therefore, vibrations generated by tubes within the tube channels 16, for example, are not transferred to the stud retainer 14 (and therefore a stud secured within the stud retainer that connects to a vehicle, for example).

FIG. 3 illustrates a lateral view of a molded connector assembly 70, according to an embodiment of the present invention. FIG. 4 illustrates a lateral view of the stud retainer 14 positioned above a routing clip 71 (that is, a portion of the main body) of the connector assembly 70.

Referring to FIGS. 3 and 4, the connector assembly 70 is similar to the assembly 10. However, the assembly 70 includes a latching cover 72 connected to the main body 74 through a hinge 76. In this manner, tubes, lines, or the like, may be positioned within tube channels 16, securing chambers 78, or the like, and the latching cover 72 may pivot into a securing relationship.

The stud retainer 14 is similar to the stud retainer 14 shown in FIGS. 1 and 2. However, as shown, the stud retainer 14 includes additional retaining arms 32. Additionally, flexible braces 80 extend downwardly from the top wall 24. The braces 80 are angled opposite to the fingers 36. That is, the braces 80 include flex joints 82 secured to the top wall 24 and/or the beams 22. However, free ends 84 are oriented closer to the base 20 in the direction of arrow A than the flex joints 82.

Similar to the embodiment of FIGS. 1 and 2, the flash gates 18 are configured to be broken when the stud retainer 14 is urged into a channel in the direction of arrow A.

FIG. 5 illustrates a transverse cross-sectional view of the assembled connector assembly 70, according to an embodiment of the present invention. The latching cover 72 latchably secures to the main body 74 by way of a latch 90. As such, the tube channels 16 and securing chambers 78 are completed.

FIG. 6 illustrates a transverse cross-sectional view of the stud retainer 14 securely isolated within the routing clip 71 of the connector assembly 70. The fingers 36 engage interior surfaces 92 of the routing clip 71 as described above with respect to FIGS. 1 and 2.

A recessed, outer edge 94 of the top wall 24 snapably secures to the opposing clips 42. However, the braces 80 may ensure that the edge 94 remains engaged with the clips 42.

The free ends 84 of the braces 80 abut into an upper surface 96 of the routing clip 71 about the channel 26. Because the braces 80 are flexible, the braces 80 are also capable of absorbing vibratory energy between the stud retainer 14 and the routing clip 71. Therefore, the braces 80 provide a shock-absorbing structure, in additional to the fingers 36, that assists in isolating the stud retainer 14 within the routing clip 71. While the fingers 36 isolate the stud retainer 14 from lateral vibrations, the braces 80 isolate the stud retainer from axial vibrations.

Embodiments of the present invention provide a method for assembling a connector assembly. First, the connector assembly is formed as a single piece with the stud retainer secured to the main body/routing clip through flash gates. The stud retainer is then driven into a channel, thereby breaking the flash gates. The fingers and/or braces then provide a flexible interface between the stud retainer and the main body/routing clip that dampens and/or absorbs vibratory energy therebetween.

Thus, embodiments of the present invention provide a system and method for isolating a stud retainer within a connector assembly. Embodiments of the present invention include flexible fingers that absorb shocks and vibrations between the stud retainer and the connector assembly, thereby ensuring that the shocks and vibrations are not transferred from the components to studs or other such fasteners within a vehicle, for example. Embodiments of the present invention may also include flexible braces that further dampen shocks and vibrations.

Embodiments of the present invention, unlike prior designs, isolate the vehicle attachment feature itself (for example, the stud retainer) to reduce the amount of vibration from tubes.

While flexible fingers and braces are shown and described, the flexible interfaces may be a variety of different geometries.

While various spatial and directional terms, such as top, bottom, lower, mid, lateral, horizontal, vertical, front and the like may used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A connector assembly configured to secure tubing to a vehicle frame, the connector assembly comprising:
   a main body including tube-securing chambers and a smooth walled retainer channel; and
   a stud retainer aligned with said retainer channel and integrally connected to said main body through flash gates, wherein said stud retainer includes a base integrally connected to beams that are in turn integrally connected to a wall opposite said base, wherein a stud retainer chamber is defined between said base, said beams, and said wall, and wherein a plurality of vibration damping fingers extend outwardly from said beams so as to abut said smooth walled retainer channel, wherein said flash gates are configured to be broken so that said stud retainer is retained and isolated within said retainer channel.

2. The connector assembly of claim 1, wherein said main body comprises opposing clips configured to snapably secure to a portion of said wall.

3. A connector assembly configured to secure tubing to a vehicle frame, the connector assembly comprising:
   a main body including tube-securing chambers and a smooth walled retainer channel; and
   a stud retainer aligned with said retainer channel and integrally connected to said main body through flash gates, wherein said stud retainer includes a base integrally connected to beams that are in turn integrally connected to a wall opposite said base, wherein a stud retainer chamber is defined between said base, said beams, and said wall, wherein a plurality of vibration damping fingers extend outwardly from said beams so as to abut said smooth walled retainer channel, and wherein each of said fingers includes a flex joint integrally connected to one of said beams, wherein an angled free end outwardly extends from said flex joint, and wherein said flex joint is closer to said base than said angled free end.

4. The connector assembly of claim 1, wherein said stud retainer further comprises at least one flexible brace extending from said wall toward said base.

5. The connector assembly of claim 1, wherein said stud retainer further comprises retaining arms extending from said beams within said stud retainer chamber.

6. The connector assembly of claim 1, wherein said main body further comprises a latching cover configured to be selectively opened and closed to allow tubing to be positioned within said tube-securing chambers.

7. A stud retainer configured to securely retain a fastening stud, the stud retainer comprising:
   a base integrally connected to beams that are in turn integrally connected to a wall opposite said base, wherein a stud retainer chamber is defined between said base, said beams, and said wall;
   a vibration-damping interface extending outwardly from said beams, wherein said vibration-damping interface comprises a plurality of fingers, wherein each of said fingers includes a flex joint integrally connected to one of said beams, wherein an angled free end outwardly extends from said flex joint, and wherein said flex joint is closer to said base than said angled free end; and
   retaining arms extending from said beams within said stud retainer chamber, each retaining arm including a hinge integrally connected to a stud engagement member, each hinge extending from an associated interior surface of one of said beams, such that each hinge is angled away from a plane of said base so that said hinge is closer to said base than said stud engagement member.

8. The stud retainer of claim 7, further comprising at least one flexible brace extending from said wall toward said base.

9. The stud retainer of claim 8, wherein said at least one flexible brace comprises a flex joint proximate said wall, and a free end extending outwardly from said flex joint, wherein said free end is closer to said base than said flex joint.

10. A connector assembly comprising:
    a main body including tube-securing chambers formed through said main body, a retainer channel within said main body, and opposing clips extending from an outer surface; and a stud retainer aligned with said retainer channel and integrally connected to said main body through flash gates, wherein said flash gates are configured to be broken so that said stud retainer is retained and isolated within said retainer channel, wherein said stud retainer includes a base integrally connected to beams that are in turn integrally connected to a wall opposite said base, wherein said opposing clips are configured to be snapably secured to a portion of said wall, wherein a stud retainer chamber is defined between said base, said beams, and said wall, wherein a plurality of vibration damping fingers extend outwardly from said beams, wherein each of said fingers includes a flex finger joint integrally connected to one of said beams, wherein an angled free finger end outwardly extends from said flex finger joint, and wherein said flex finger joint is closer to said base than said angled free end.

11. The connector assembly of claim 10, wherein said stud retainer further comprises at least one flexible brace extending from said wall toward said base.

12. The connector assembly of claim 11, wherein said at least one flexible brace comprises a flex brace joint proximate said wall, and a free brace end extending outwardly from said flex brace joint, wherein said free brace end is closer to said base than said flex brace joint.

13. The connector assembly of claim 12, wherein said stud retainer further comprises retaining arms extending from said beams within said stud retainer chamber.

14. The connector assembly of claim 10, wherein said main body further comprises a latching cover configured to be selectively opened and closed to allow tubing to be positioned within said tube-securing chambers.

* * * * *